United States Patent
Aaron et al.

(10) Patent No.: US 10,593,320 B2
(45) Date of Patent: *Mar. 17, 2020

(54) LEARNING TRANSCRIPTION ERRORS IN SPEECH RECOGNITION TASKS

(71) Applicant: International Business Machines Corporation, Armonk, NY (US)

(72) Inventors: Andrew Aaron, Ardsley, NY (US); Shang Guo, Cortlandt Manor, NY (US); Jonathan Lenchner, North Salem, NY (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/863,937

(22) Filed: Jan. 7, 2018

(65) Prior Publication Data

US 2019/0213996 A1 Jul. 11, 2019

(51) Int. Cl.
*G10L 15/22* (2006.01)
*G10L 15/18* (2013.01)
(Continued)

(52) U.S. Cl.
CPC .............. *G10L 15/01* (2013.01); *G06N 20/00* (2019.01); *G10L 13/043* (2013.01);
(Continued)

(58) Field of Classification Search
None
See application file for complete search history.

(56) References Cited

U.S. PATENT DOCUMENTS

| 7,860,716 B2 * | 12/2010 | Tian | G10L 15/01 |
| | | | 704/251 |
| 10,186,257 B1 * | 1/2019 | Corfield | G10L 15/18 |

(Continued)

OTHER PUBLICATIONS

IBM Patents or Patent Applications Treated as Related.
(Continued)

*Primary Examiner* — Seong-Ah A Shin
(74) *Attorney, Agent, or Firm* — Jeffrey S LaBaw; Feb R Cabrasawan

(57) ABSTRACT

A mistranscription generated by a speech recognition system is identified. A set of known utterance members is provided for use by a speech recognition system. Each utterance member consists of a respective plural number of words. A received utterance is matched to a first utterance member within the set of known utterance members. The first utterance member is a closest matching utterance member and has a first plural number of words. The matching operation matches fewer than the first plural number of words in the received utterance and the received utterance varies in a first particular manner as compared to a first word in a first slot in the first utterance member. The received utterance is sent to a mistranscription analyzer component which increments evidence that the received utterance is evidence of a mistranscription. Once the incremented evidence for the mistranscription exceeds a threshold, future received utterances containing the mistranscription are treated as though the first word was recognized.

20 Claims, 10 Drawing Sheets

(51) Int. Cl.
*G10L 15/01* (2013.01)
*G10L 15/08* (2006.01)
*G10L 15/06* (2013.01)
*G10L 13/04* (2013.01)
*G10L 15/26* (2006.01)
*G06N 20/00* (2019.01)

(52) U.S. Cl.
CPC .......... *G10L 15/063* (2013.01); *G10L 15/22* (2013.01); *G10L 15/26* (2013.01)

(56) References Cited

U.S. PATENT DOCUMENTS

| | | | | |
|---|---|---|---|---|
| 2004/0006470 | A1* | 1/2004 | Kobayashi | G10L 15/142 704/255 |
| 2005/0251390 | A1* | 11/2005 | Catchpole | G10L 15/187 704/242 |
| 2006/0069557 | A1* | 3/2006 | Barker | G10L 15/01 704/234 |
| 2007/0055514 | A1* | 3/2007 | Beattie | G10L 15/08 704/235 |
| 2010/0100379 | A1* | 4/2010 | Abe | G10L 15/18 704/235 |
| 2014/0303973 | A1* | 10/2014 | Amarilli | G10L 15/08 704/235 |
| 2015/0039309 | A1* | 2/2015 | Braho | G10L 15/01 704/236 |
| 2015/0348541 | A1* | 12/2015 | Epstein | G10L 15/063 704/257 |
| 2016/0133253 | A1* | 5/2016 | Braho | G10L 15/22 704/251 |
| 2016/0365092 | A1* | 12/2016 | Moreno Mengibar | G10L 15/197 |
| 2018/0150605 | A1* | 5/2018 | Co | G06F 17/2836 |

OTHER PUBLICATIONS

J. Hirschberg, D. Litman and M. Swerts, "Detecting Misrecognitions and Corrections in Spoken Dialogue Systems from Aware' Sites", ITRW on Prosody in Speech Recognition and Understanding, 2001.

C. Halverson, D. Horn, C-M. Karat and J. Karat, "The Beauty of Errors: Patterns of Error Correction in Desktop Speech Systems," Proceedings of INTERACT, 1999.

Strzalkowski, Tomek, and Ronald Brandow. "A Natural Language Correction Model for Continuous Speech Recognition." Proceedings of the Fifth Workshop on Very Large Corpora. 1997.

Fusayasu, Yohei, et al. "Word-error correction of continuous speech recognition based on normalized relevance distance." Proceedings of the 24th International Conference on Artificial Intelligence. AAAI Press, 2015.

Harwath, David, Alexander Gruenstein, and Ian McGraw. "Choosing useful word alternates for automatic speech recognition correction interfaces." INTERSPEECH. 2014.

* cited by examiner

LEARNING TRANSCRIPTION ERRORS IN SPEECH RECOGNITION TASKS

BACKGROUND OF THE INVENTION

This disclosure relates generally to machine learning. More particularly, it relates to teaching a machine learning system to detect transcription errors in speech recognition tasks.

Speech recognition is a computer technology that allows a user to perform a variety of interactive computer tasks as an alternative to communicating by traditional input devices such as mouse and keyboard. Some of the tasks include communicating commands for the computer to execute a selected function or to transcribe the speech into a written transcription intended for a computer application such a spreadsheet or word processing application. Unfortunately, the speech recognition process is not error free and an important problem is to correct transcription errors or "mistranscriptions". A mistranscription occurs when the speech recognition component of a computer incorrectly transcribes an acoustic signal in a spoken utterance. In an automated speech recognition task when select words are incorrectly mistranscribed, the command may not be properly performed or the speech may not be properly transcribed. The mistranscription can be due to one or more factors. For example, it may be because the user is a non-native speaker, due to sloppy speech by the user, or because of background noise on the channel to the speech recognition system.

One type of mistranscription is a substitution error where the speech recognition system replaces the uttered word with an incorrect word. Another type of error is an insertion error where the system recognizes a "garbage" utterance, e.g., breathing, background noise, "um", or interpreting one word as two words, and so forth. Yet another type of transcription error is a deletion error where one of the uttered words does not occur in the transcription. In some cases, a deletion could occur because the speech recognition system rejects the recognized phonemes as a non-existent word according to its dictionary. Alternatively, the deletion is due to an incorrect merge of two words. For example, the user may have said "nine trees" and the system recognized the utterances as "ninety".

Conventional approaches for resolving mistranscriptions include manually examining the transcript for errors and correcting them either through an input device such as a keyboard, or by having the system identify candidate mistranscriptions and entering a dialog with the user intended to correct them. For example, the system could ask the user via a speaker, "Did you say 'chicken'?" and if the user says "no", the system will log the candidate mistranscription as an error. The number of transcription errors also can be reduced by improving the speech model for a particular user. As a greater number of speech samples are received from the particular user by the system, either by having the user read from a known transcript, or through continued use of the system by the user, the default acoustic model of the speech recognition system can be better adapted for the user.

Further improvements in computer aided speech recognition are needed.

BRIEF SUMMARY

According to this disclosure, a method, apparatus and computer program product for identification of a mistranscription generated by a speech recognition system. A set of known utterance members is provided for use by a speech recognition system. Each utterance member consists of a respective plural number of words. A received utterance is matched to a first utterance member within the set of known utterance members. The first utterance member is a closest matching utterance member and has a first plural number of words. The matching operation matches fewer than the first plural number of words in the received utterance and the received utterance varies in a first particular manner as compared to a first word in a first slot in the first utterance member. The received utterance is sent to a mistranscription analyzer component which increments evidence that the received utterance is evidence of a mistranscription. Once the incremented evidence for the mistranscription exceeds a threshold, future received utterances containing the mistranscription are treated as though the first word was recognized.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
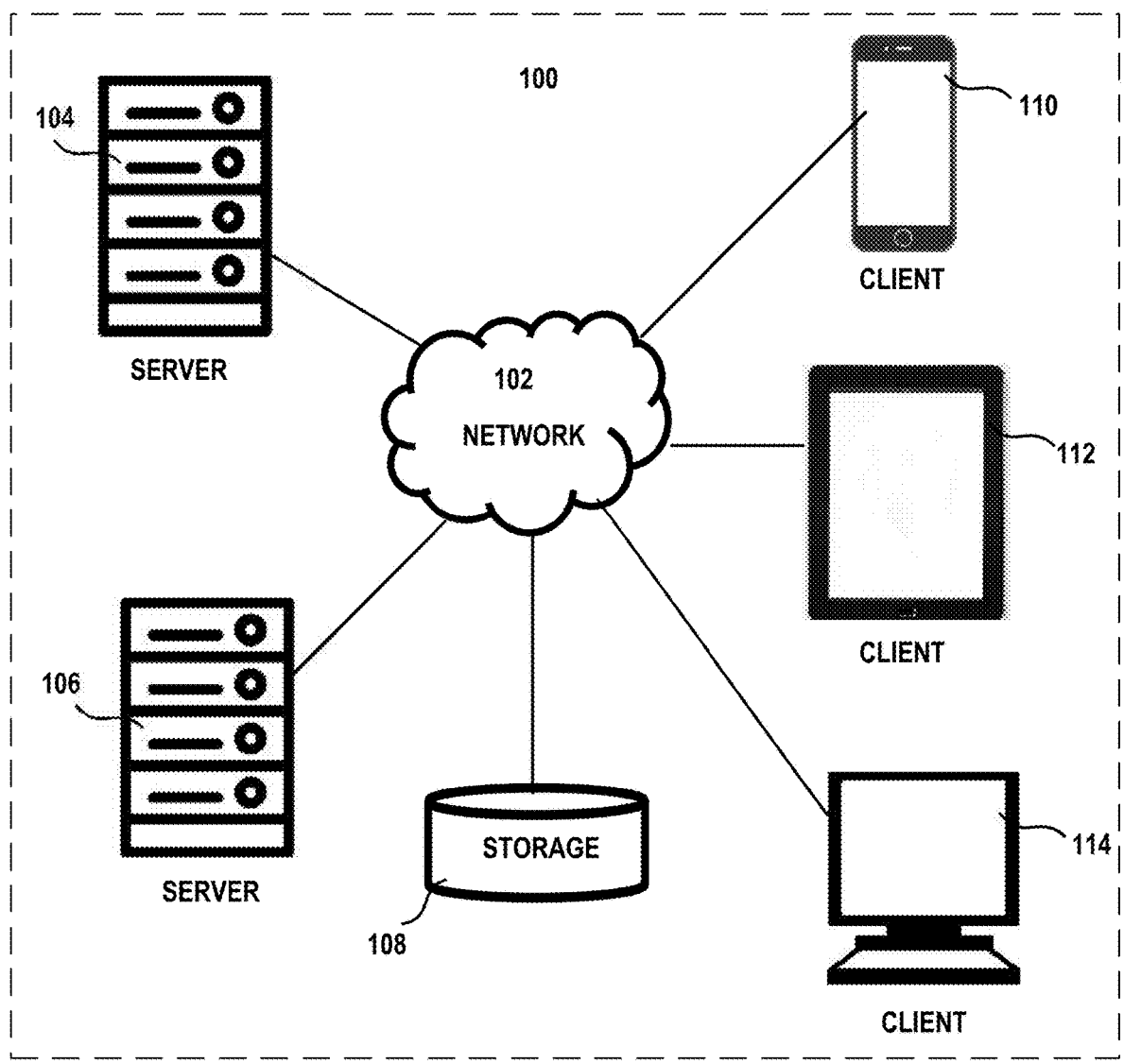
FIG. 1 depicts an exemplary block diagram of a distributed data processing environment in which exemplary aspects of the illustrative embodiments may be implemented.

At a high level, preferred embodiments of the invention provide a system, method and computer program product for machine learning for the appropriate identification and handling of a mistranscription from a speech recognition system. The invention uses a set of one or more known utterances which when recognized by the speech recognition system produce a system response. In preferred embodiments, the utterances are arranged in a set, or a "class"; when one of the utterances the class is recognized, a class system response action is performed. The recognized utterances are called "class members" when they are members of a class. Each utterance usually consists of a plurality of words, the number of words may vary according to a particular utterance. When a transcription matches some, but not all of the words in a member utterance, e.g., a word Y is recognized in place of the word X in a given slot in the class member, this transcription is taken to be some evidence of a mistranscription of word Y for word X in the member utterance. Once the evidence passes a threshold, future recognized utterances containing the mistranscription are treated as though the original word was recognized. A machine learning algorithm is employed in some embodiments to determine a confidence level that recognized word Y is equivalent to word X in the recognized utterance.

Various rules are used in embodiments of the invention by a mistranscription analyzer to determine how much the confidence level should be incremented with additional instances of the identical mistranscription. The mistranscription analyzer uses a machine learning algorithm in some embodiments. As the amount of evidence provided by a particular transcription is dependent on many factors as is detailed below. For example, the more often the system sees an expected utterance of X transcribed as Y in this or other member utterances, the greater the evidence for the mistranscription of X to Y. Further, the greater the number of words which match in a particular utterance, e.g., a long utterance with a single suspected mistranscribed word, the greater the evidence for a mistranscription is assumed to be by the mistranscription analyzer. As evidence of a particular mistranscription becomes a near-certainty, the classification system is able to treat recognized utterances having the mistranscription as though the original word was recognized. One way that embodiments of the invention accomplish this is to add new utterances, with one or more mistranscriptions replacing the original words of an existing class member, as class members to one or more classes of utterances. Another way used by other embodiments of the invention is to recognize the mistranscription as a valid alternative of the original word, so that whenever it is recognized, the system proceeds as though the original word was recognized instead.

In the following description, the process of determining whether a new mistranscription or a new utterance should be added for system use is usually described as incrementing evidence. One skilled in the art will appreciate that the incremented evidence can be used in some embodiments in a confidence calculation, e.g., as part of a machine learning system. Thus, when the incremented evidence passes a threshold, the threshold may be an accumulated evidence threshold or a confidence threshold calculated based on the accumulated evidence. In either the evidence threshold or the confidence threshold calculation, respective pieces of evidence gathered from different mistranscription instances can have different weights or effects in the threshold calculation. In preferred embodiments, the evidence for the mistranscription is incremented for individual utterance members according to how close the properties of the received utterance are to the properties of the utterance member. In other embodiments, the evidence for a mistranscription, e.g., recognizing word Y instead of word X, is incremented in a single place so that once a threshold is passed for the mistranscription, the system treats any future received utterance containing the mistranscription as though the original word was recognized.

Figure 2:
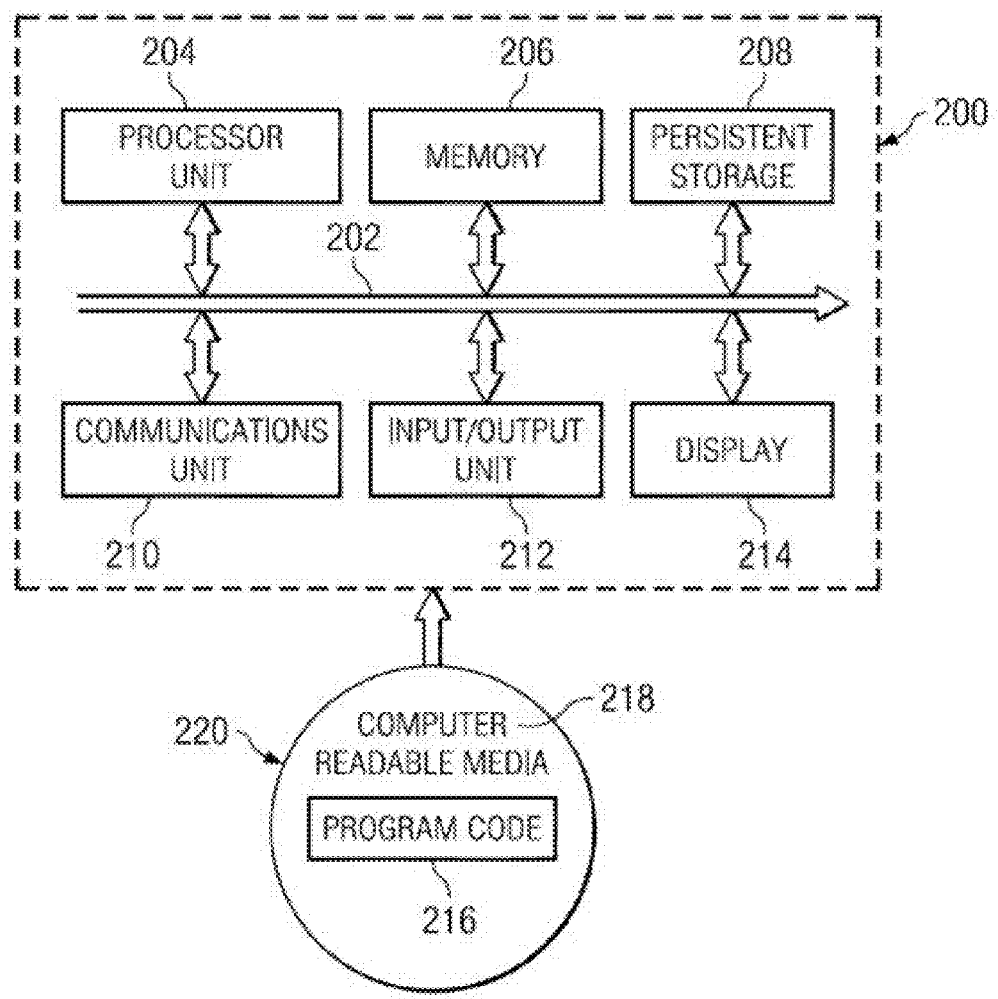
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

While humans frequently do not understand every word correctly in a conversation, humans use the context of the conversation to help piece together what the misunderstood word must have been. Speech recognition mechanisms do not have the tools that humans do to make such a contextual judgement. However, through machine learning, confidence can be learned through observation of the same repeated transcription error (sometimes coupled with user behavior) as to what a mistranscribed word must be. Embodiments of the invention allow learning by the system based on individual users and environments as well as classes of users and types of environments.

Figure 3:
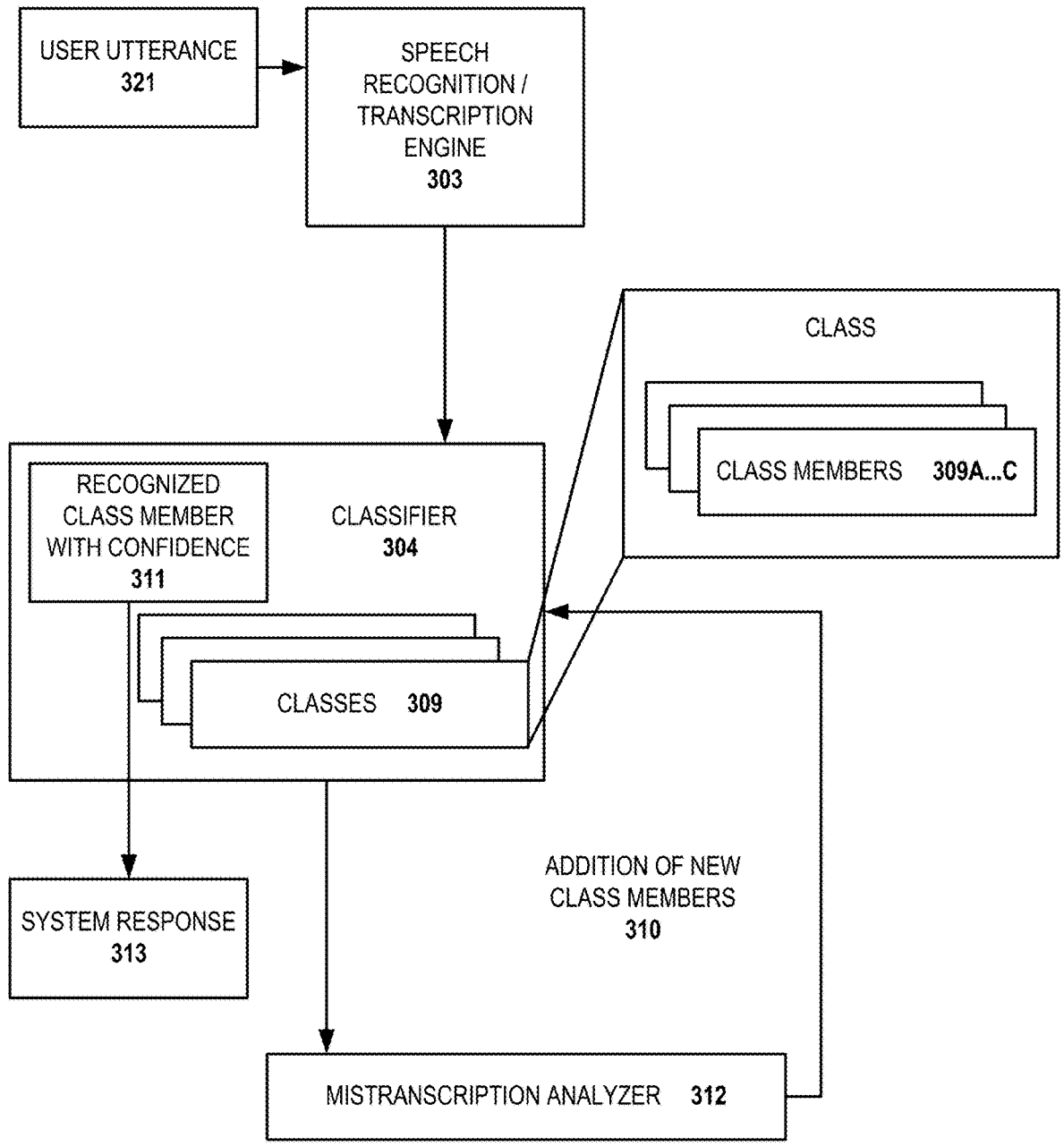
FIG. 3 illustrates an architectural diagram of components in the speech recognition system according to an embodiment of the invention.

One environment in which embodiments of the invention can be implemented is shown in FIG. 3. A speech sample 301 is received by a speech recognition system 303 to convert into text or tokens usable by a computer. Part of the speech recognition system 303 is a classifier 304, such as the IBM Watson Natural Language Classifier or the Stanford Classifier. This component identifies classes of questions or assertions (alternatively, "utterances") 309 that ask or say the same thing. For example, there may be a class for asking the directions to the nearest restroom. Such a request can come in many forms, i.e. "Which way is the restroom?", "Where is the restroom", "Which way is the loo?", etc. In this case, "Which way is the restroom?", "Where is the restroom" and "Which way is the loo?" are referred to as class instances 309a . . . 309c. All instances have the same "intent". The classifier takes an utterance and tries to match it to any of its known classes and class instances. The classifier 304 returns a highest confidence class, together with a confidence 311. If the returned confidence exceeds a threshold set by the system, the system responds 313 with the designated response associated with the given class. At the same time, the mistranscription analyzer 312 goes through each of the class members of the most highly matching class and finds the closest matching class member. If there is no exact match, after the accumulation of sufficient evidence, a new class member is added to the class in step 310. If a close class instance is found, then the system attempts to deduce what word (or words) may have been mistranscribed for what known word (or words) in a process that is articulated in greater detail below. Suspected mistranscribed word pairs are stored in the Mistranscribed Word Pair Data Store 325. This data store 325 stores the word that was (or words that were) misheard, and the correct word. In alternative embodiments of the invention, the utterances are not organized in classes, instead each utterance has its own associated system response. Most of the description below describes embodiments which organize the utterances in classes as class instances or members. In some embodiments of the invention, the mistranscription analyzer 312 uses a machine learning algorithm to increment the amount of evidence of a particular mistranscription. As will be discussed below, a particular mistranscription instance can increment differing amounts of evidence for different class members depending on the rules used by the mistranscription analyzer 312.

In embodiments of the invention, all of the components could be resident in a single system. In other embodiments, some of the components could be distributed among different systems. For example, the speech sample could be acquired by a client system, for example a smartphone, the speech recognition system 303, the classifier 304 and class storage 309 can be resident at a server, and the system response 313 could be a speech response played back at the client, or a response performed at yet another system in the distributed network.

In a first phase of operation, the classifier 304 will recognize individual class members and, if a class member is recognized, produce the appropriate system response 313. In many cases, the system response will be speech generated by the system, e.g., an answer to a user question. The system response 313 could be a non-speech response, for example, a retrieval and visual display in a graphical user interface of a window or web page requested by the user.

In embodiments of the invention, feedback is collected from the user to the system response. Feedback may take the form of an additional speech sample, e.g., an additional similar question, negative responses, "That is not what I meant", or implicitly by the lack of an additional response indicating acceptance of the response as correct. Other user input can indicate acceptance or rejection of the response. For example, if the user asked a question about a subject that the speech recognition system is knowledgeable, or about a web page displayed on the system, and the user proceeds to interact with the system or proceeds to the view the web page in a way that is not surprising, such actions can be interpreted by the system as acceptance of the response. When the classifier 304 cannot recognize the initial speech sample as a class member, in embodiments of the invention, the speech recognizer 303 can generate clarifying questions to prompt the user for additional information and/or speech samples.

In the first phase of operation, the classifier 304 will also send a message with the recognized speech 305 which does not match a recognized class member to the mistranscription analyzer 312. In an embodiment of the invention, the mistranscription analyzer 312 attempts to swap different possible mistranscriptions as obtained from the Mistranscription Word Pairs Data Store 325, and resubmit the text to the Classifier 304, e.g. as a candidate class member.

In a second phase of operation, the mistranscription analyzer 312 adds class members to the existing set of classes for use by the classifier 304. The mistranscription analyzer 312 stores occurrences of the candidate class member including the candidate mistranscription(s) in the candidate class which it calculates the recognized speech most likely belongs. As more occurrences of the same candidate class member and same candidate mistranscription(s) are stored, the greater the confidence that the candidate class member belongs in the class and the candidate mistranscription is an alternative form of a word in an existing class member. When a threshold is reached, the candidate class member is added to the class as a recognized class member 311 for use by the classifier 304 to generate system responses 313 to the user. In alternative embodiments of the invention, the class storage 309, is shared between the mistranscription analyzer 312 and the classifier 304. When a candidate class member is added to the class as a new class member by the mistranscription analyzer 312, the classifier 304 will simply start using it.

Embodiments of the invention also include as part of the second phase of operation, "prospective class members" or "candidate class members" which the classifier 304 uses to recognize an utterance. The mistranscription analyzer 312 has a growing confidence level in a candidate class member and a candidate mistranscription and places the prospective class member in the class to accelerate evidence accumulation. The mistranscription analyzer 312 calculates an intermediate confidence level which exceeds a first intermediate threshold, but is below a second threshold needed for the mistranscription and the candidate class member to be added as a recognized member of the class. The classifier 304 uses the prospective or candidate class member which passes the intermediate threshold to produce a system response 313 as though it was a recognized class member, or enter an interactive dialog with the user, e.g., "I think you want to do X. Is this correct?" with X being the correct system response for the class. The user response, if affirmative, adds to the evidence that the candidate class member and candidate mistranscription should be added to the class.

As a configuration step to operating the system described above, sets or "classes" of recognized utterances that the system is able to recognize and potentially respond to are created and stored in the class storage 309. These sets may be thought of as "classes" in the sense of a text classifier, such as those used in the Watson Natural Language Classifier, or similar classifiers. The classes are built up from a set of members that constitute a variety of ways of making the essentially same utterance. For example, the class with template question "How do I get to the bathroom?" may have alternative instances: "Where is the bathroom?", "Which way is the bathroom?", "Which way is the restroom?" and so forth. Manual creation of the classes is used in some embodiments, but as discussed below, in some embodiments there are a set of automated techniques which can extend the manually created classes. Also, as described herein, the mistranscription analyzer 312 provides new class members based on reoccurring mistranscriptions.

When a speech recognition system translates a spoken utterance into words, it may transcribe one or more words in the utterance incorrectly. As discussed above, this is called a mistranscription or a transcription error. In preferred embodiments of the invention, if a "match" occurs for one of the class members on N−1 of N words in an utterance, i.e. only one word does not match the class member, then the mistranscription analyzer views this as evidence that there was a mistranscription of the mismatched word. One rule used by the mistranscription analyzer to increment evidence is that the larger N (the number of words in the member) for a given N−1 (the number of matching words), the greater the evidence that there is a mistranscription. In embodiments of the invention, another rule is that the closer the phonetic similarity between the word in the class member and the candidate mistranscription, the greater the evidence there was a mistranscription. A typical mistranscription will be a word which has a similar sound to the intended word at the same place in the class member. In many instances, the words or phrases in the candidate class member sounds similar to those in the class member, otherwise the speech recognition system would not be producing mistranscriptions.

Thus, in the above case, suppose that the speech recognition system transcribed "Which wake is the restroom?" rather than "Which way is the restroom?", then the mistranscription analyzer views this as some evidence that "wake" may be a mistranscription of "way". The more often instances of this same mistranscription occur, the more evidence is gathered and the more confident the mistranscription analyzer is in the mistranscription. At some point, the mistranscription analyzer is so confident that it is a mistranscription, a threshold is crossed. In embodiments of the invention where classes of utterances are used, the candidate class member is added to the class and the system performs an action, e.g., a verbal answer, as if it actually recognized "Which way is the restroom?"

In embodiments of the invention, at lower confidence levels, the system may perform a second action, e.g., ask for clarification, saying for example, "I didn't quite hear that, did you ask for directions to the restroom?" In yet other embodiments of the invention, there may be a threshold at a first, lower, intermediate confidence level where the candidate class member is added to a class as a "probationary" member. The system will collect user responses when it performs the appropriate action for a class member, and feed those responses back to the mistranscription analyzer. Thus, user responses which indicate acceptance of the system response will increase the confidence of the mistranscription, whereas user responses which indicate rejection of the system response will reduce confidence that the mistranscription is for the class member. As the confidence level increases because users keep accepting the system response, the confidence level passes a second higher level, and the candidate class member transitions from the probationary status to a permanent status as a class member of the class.

Embodiments of the present invention uses machine learning to identify mistranscriptions from spoken text generated from a speech recognition system. In embodiments of the invention, classes of utterances having a similar meaning are used to interact with the user. Classes comprise a set of member utterances, each member utterance $U\_i$ consisting of a respective number of $N\_i$ words. When a transcription matches some but not all of these words, e.g., $N\_i-1$, and uses a word Y in place of the word X in a given slot, e.g., the jth slot, in the member utterance, this transcription is taken to be some evidence of a mistranscription of word Y for word X.

The more often the system sees an expected utterance of X transcribed as Y in this or other known utterances, the greater the evidence for the mistranscription. As mentioned above, one rule is the greater the number of words $N\_i$ in a particular utterance with a single suspected mistranscribed word, the greater the evidence for a mistranscription is assumed to be.

Embodiments of the invention allow the mistranscription confidences to be aided by a knowledge of the same or similar speaker. The same speaker or similar speakers are more likely to mispronounce or use words in the same or similar ways. One measure of similarity that can be used is that the speakers are detected to have the same L1 language, i.e. native speakers of the same first language. Another measure of similarity is that the users share the same environment, e.g., workplace or organization, and will tend to use the same vocabulary. In embodiments of the invention, different classes of member utterances are stored for different users or different user classes. Embodiments of the invention utilize user based rules to add evidence of mistranscriptions.

Embodiments of the invention allow the mistranscription confidences to be aided by knowledge of the same or similar environment. While there is some overlap with the users from the same workplace or organization above, in this category, the same user will use different words in different environments. The words used in a home environment as opposed to a work environment will tend to be different. Further, certain types of mistranscriptions are more prevalent in different types of environments, e.g., an insertion error in a noisy environment. In embodiments of the invention, different classes of member utterances are stored for particular environments or environment types. Embodiments of the invention use environment based rules to add evidence of mistranscriptions.

Yet other embodiments of the invention allow the mistranscription confidences to be aided by a knowledge of whether the word and suspected mistranscribed word have a degree of phonetic similarity.

In embodiments of the invention, a mistranscription of a given word in one class member is considered evidence of a mistranscription of that word in other class members which use the same word. In these embodiments, the evidence can be accumulated prospectively, before the mistranscription is actually encountered in a class member. For example, the word "thorough" might be mistranscribed as "the row" or vice versa in a first class member. In embodiments of the invention, the system will accumulate some, preferably lesser evidence to other class members which share the mistranscribed word(s). Embodiments of invention may also accumulate evidence for these words in other classes. The rules in some of the embodiments indicate that less evidence is accumulated in utterances in other classes than for fellow class members.

Other embodiments of the invention use regular expressions to allow different orders of words in a candidate class member from an existing class member which is a potential match. A different word order is allowable in the candidate class member, but would mean there is less strong of a signal, i.e. less confidence that the candidate mistranscriptions are true mistranscriptions.

In embodiments of the invention, the mistranscription analyzer also takes into account the environment, geographic proximity and situational awareness for interpreting a confusing word. For example, an expression such as "Which way is the Restroom?" can be easily confused with an expression: "Which way is the Restaurant?" If a person utters that expression while driving, a first environment or environment type, it is more likely that the second expression is correct, i.e. that is the person is looking for a restaurant. While if an expression is uttered within an office space, it is more probable that the first expression is correct.

Similarly, another pair of confusing statements are: "Let's get moving." and "Let's get to the movie." These two sentences can be distinguished based on the context such as whom a respective sentence has been uttered to. An office manager would more likely be saying the first sentence to his/her employees, whereas the second is more likely to be said between two friends.

Figure 4:
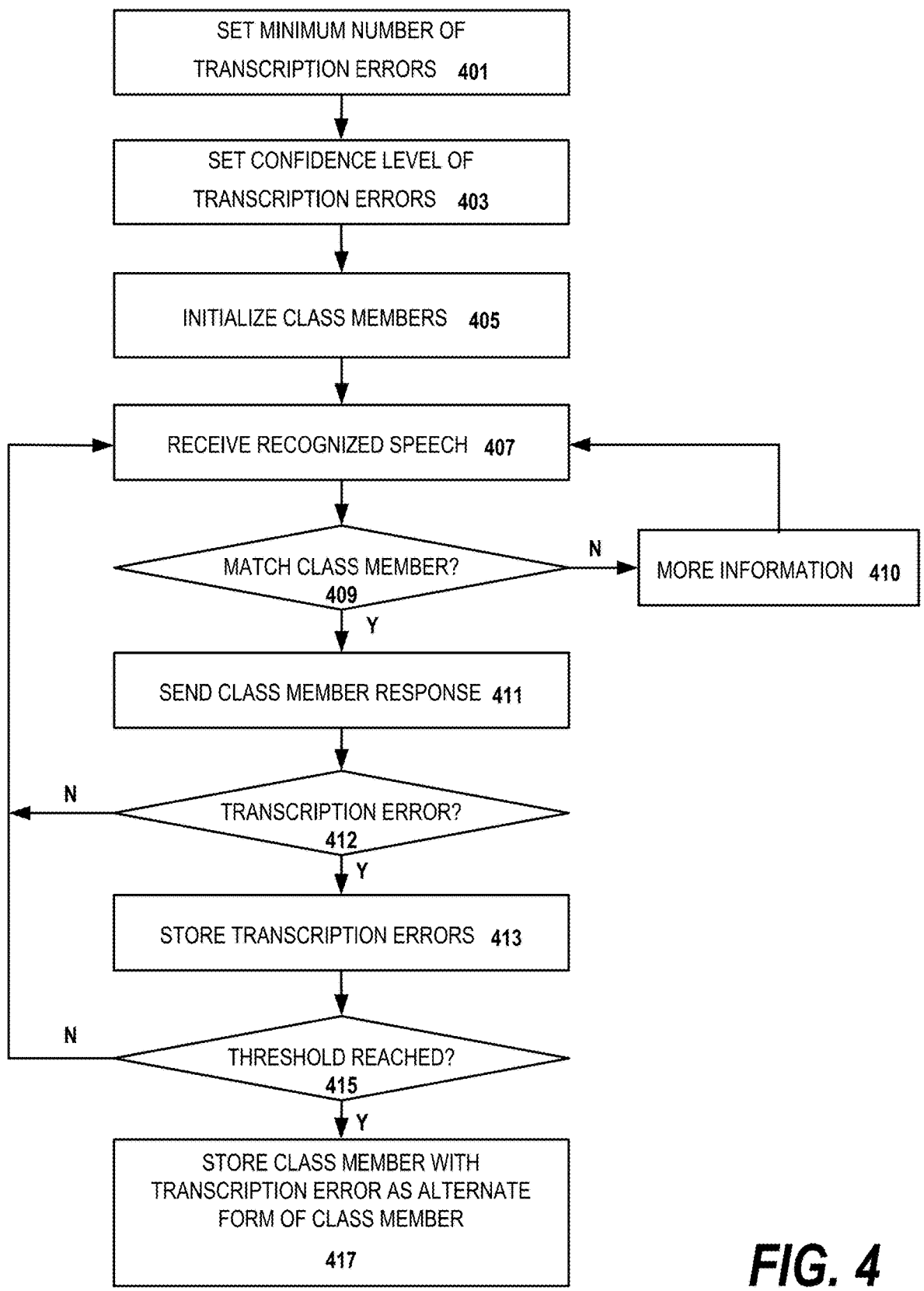
FIG. 4 illustrates a flow diagram of operating a speech recognition system according to an embodiment of the invention.

A flow diagram of an embodiment of the invention is shown in FIG. 4. In step 401, the minimum number of transcription errors is set. Thus, in one embodiment, the value of MISTRANSCRIP_MIN_SEEN=minimum # is set to the number of mistranscription instances for the same mistranscription which must be seen before making the candidate mistranscription or the candidate class member "recognized", that is, one on which the system will act. In step 403, a threshold for the confidence level that there has been a transcription error is set. Thus, the value of MISTRANSCRIP_THRESH=probability/confidence above which system recommends assuming a recognized word is a mistranscription. The two thresholds are set because the amount of evidence gathered per instance of a candidate mistranscription varies. Each instance of a mistranscription will potentially have a different context and a different number of matching and nonmatching words between the candidate class member and existing class member.

Other values such as the allowed number of transcription errors per candidate class member are set before the instance can be considered a candidate mistranscription, for example, in one preferred embodiment, MAX_FRACTION_MISTRANSCRIBED=maximum fraction of mistranscribed words allowed per utterance is set. If there are too many candidate mistranscriptions in a single candidate mistranscription, it is unlikely that there is good evidence that the recognized utterance is a class member. In alternative embodiments, different thresholds are set.

In step 405, the natural language classifier is initialized with a set of classes that the system can respond to. In embodiments of the invention, a set of synsets are also initialized in the classifier. The synsets are sets of equivalent words or phrases which can be substituted for class members in the class. In this way, the class members can be extended without listing every possible variant of a class member as an individual class member. Each class in the set of classes is associated with a so-called intent, and each intent is mapped to a response for the system to take once the intent is recognized.

When an utterance is submitted to the system, step 407, in one embodiment, the speech is recognized and if the classifier determines the utterance matches a class member, step 409, the appropriate response for that class is returned to the user, step 411. In other embodiments of the invention, rather than an exact match, a confidence level is used to determine whether a response should be returned. For example, a response is evaluated by the classifier, giving the top T classes and an associated confidence CONF_i for each class. CONF_0 is the class with the highest confidence. When CONF_0 exceeds a threshold THRESH, the classifier system responds with the system response it knows to be associated with the intent of the associated class, step 411. For example, if the intent is "Restroom Directions" then the system response will be to provide directions for getting to the restroom. In embodiments of the invention, if there is not an exact match or if the confidence does not exceed the threshold level, the system will enter an interrogative mode, in which more information is received from the user, e.g., by asking the user clarifying questions and analyzing the user utterances made in response to the questions, step 410.

Next, it is determined whether there was a candidate transcription error, step 412. In some embodiments, this step is performed by the classifier and passed on to the mistranscription analyzer. In other embodiments, all recognized utterances are passed on to the mistranscription analyzer which will make the determination whether a transcription error occurred. The process of determining a mistranscription is discussed in greater detail below. If there is a transcription error, the transcription error and its place in a class member is stored, step 413. If not, the system returns to listen for additional user utterances.

As the mistranscription analyzer receives mistranscriptions in new instances and the mistranscriptions reoccur in user utterances, the mistranscription analyzer will accumulate more and more evidence that the recognized word is a mistranscription. Each instance will potentially provide different amounts of evidence. If all of the words but one word match a class member, in embodiments of the invention, this will be more evidence than an instance in which several of the words in the utterance do not match the class member. As the evidence accumulates, the confidence level will meet a threshold for a mistranscription, step 415. Once the confidence level passes the threshold, the class member with the mistranscription is stored as an alternative form of the class member. In embodiments of the invention where synsets are used, the mistranscription may be stored as part of the synset for the class. Other embodiments use other means for storing the mistranscription as a valid alternative for the original word(s).

Figure 5:
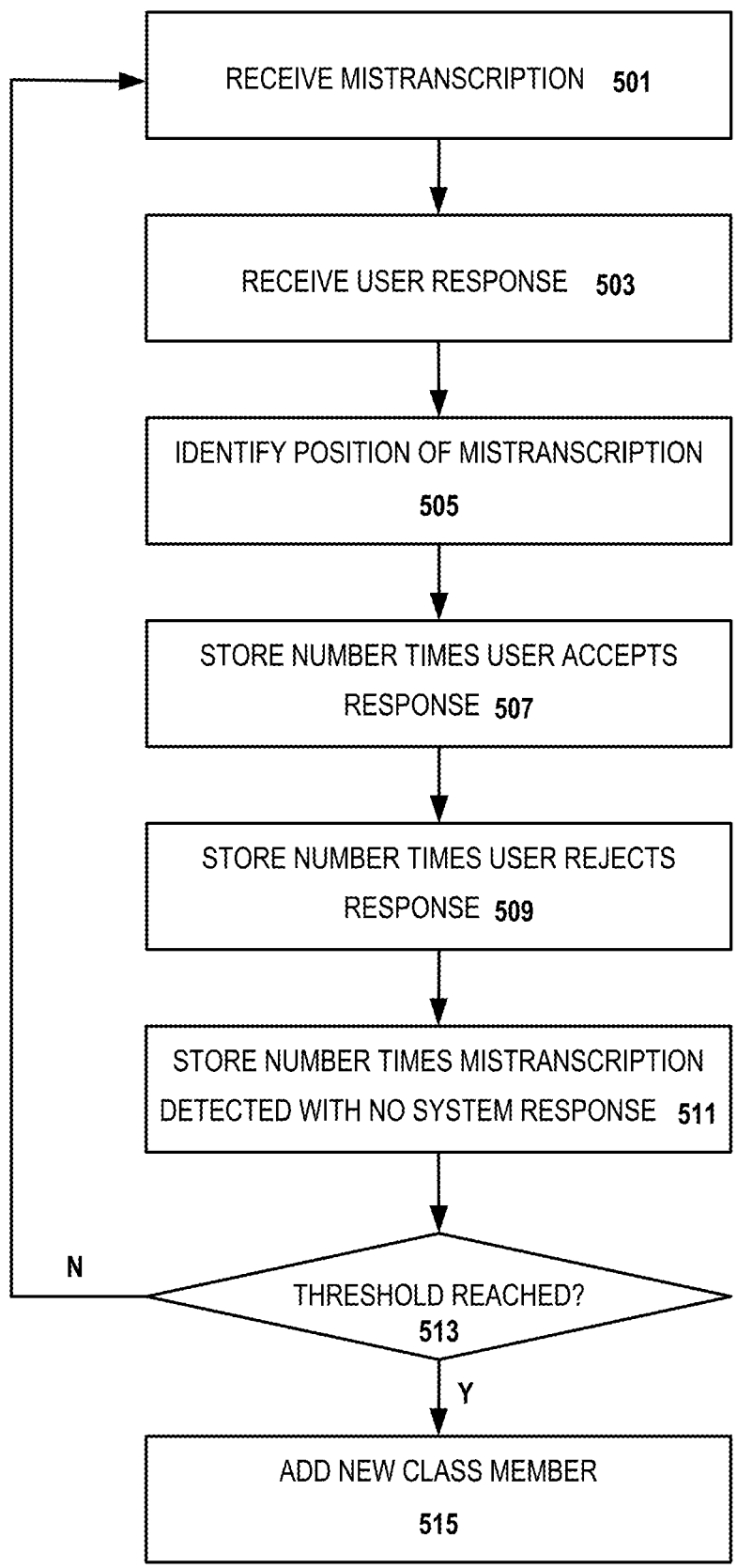
FIG. 5 is a flow diagram of adding a class member based on user responses according to an embodiment of the invention.

FIG. 5 illustrates a flow diagram for one embodiment of the invention for adding a new class member. In the illustrated embodiment, an intermediate confidence level for a candidate class member is used to send a system response to the user and increment evidence of a mistranscription. The classifier sends a message containing the candidate mistranscription, the candidate class member and a user response to a system response for the candidate mistranscription to the mistranscription analyzer. (Not shown)

In step 501, the mistranscription is received from the classifier by the mistranscription analyzer. The user response is received in step 503. In step 505, the position of the mistranscription with the class member is identified. For example, each time a class member is detected by the classifier and the word-by-word transcription matches N-k of N of the words in the most closely matching class instance, and there are also N words used in the transcription of the utterance, let the non-matching word pairs be denoted by $(w\_\{i\_j\}, a\_\{i\_j\})$ where there are k indices $\{i\_j\}$. In embodiments of the invention, the pair $(w\_\{i\_j\}, a\_\{i\_j\})$ is stored, in a hash of potential mistranscriptions. For example, $a\_\{i\_j\}$ is the potential mistranscription of the word $w\_\{i\_j\}$ where word $w\_\{i\_j\}$ appears in the class instance. The position of the mistranscription is part of the bundle of information received from the classifier in some embodiments, however, in other embodiments, the determination is performed by the mistranscription analyzer.

In addition to the word pairs, in embodiments of the invention, the mistranscription analyzer stores three additional values. In step 507, the system stores the number of times the classifier has responded, under the assumption of a mistranscription, and the answer given seems to have been accepted by the user. In step 509, the system stores the number of times the classifier has responded assuming the mistranscription, but instead the response given seems to have been rejected by the user. In step 511, the system stores, the number of times the mistranscription was detected, i.e. there is a direct correspondence between $w\_\{i\_j\} \rightarrow a\_\{i\_j\}$ of the word in a top class instance to an alternative word in the transcription, but the system's confidence in the top class does not exceed THRESH (the intermediate threshold), so no response is given by the system.

In one example, the system stores $(w\_\{i\_j\}, a\_\{i\_j\}, 5, 2, 4)$, meaning that 5 times the assumption of a mistranscription led to a response accepted by the user, twice the assumption of mistranscription led to rejection of the response by the user and 4 times the word $a\_\{i\_j\}$ was seemingly heard in place of $w\_\{i\_j\}$ but the classifier's confidence in the top class did not exceed THRESH_1 so no system response was given. In this illustrative embodiment, a general entry in the mistranscription hash is given by (w, a, CO, IN, NO)—where w=correct word, a=potentially mi-transcribed word, CO=correct count, IN=incorrect count and NO=no-response count.

The process continues until the top class threshold of an utterance exceeds the higher threshold level, THRESH_2, step 513, meaning that the machine learning system has enough confidence in the mistranscription that it is stored as an alternative class member or there are no remaining word pairs (w_i, a_i) representing candidate mistranscriptions remaining to be replaced.

Note that there may be several words which are candidate mistranscriptions, a_i, in an utterance for which there are 5-tuples (w_i, a_i, CO_i, IN_i, NO_i). In this case, the process is iterated where the replacement a_i−>w_i is made in decreasing order of confidence in the correction, i.e. in decreasing order of CO_i/(CO_i+IN_i). The process continues so long as the number of words, M, that are mistranscribed, and the total number of words, N, are not such that M/N>MAX_FRACTION_MISTRANSCRIBED.

In different embodiments of the invention, class members can be stored which are specific to each user, a user class, a particular environment, e.g., a location, or an environment type. Training class members according to a particular user has a tradeoff that the training will be more accurate to the specific types of mistranscriptions that the user is likely to make versus fewer samples of recognized speech from a single user which is likely to mean that the machine learning will take longer to train than to train with multiple users. Training according to a class of users has the advantage of more samples of recognized speech, and thus quicker machine learning, but at the risk of possible misclassification of respective users as members of the user class, or mishandling of mistranscriptions which are unique to a particular user.

Training class members according to a specific environment, or type of environment is also useful to acquire more speech samples than could be acquired from a single user. Types of environment could include a noisy environment as compared to a quiet environment. Alternatively, the type of environment could be one in which certain activities take place, e.g., car, home, work or school. The system must categorize environment by type, the environment type may require user input, e.g., confirming the environment type. Alternatively, the system could use geolocation inputs together with mapping data to categorize the environment, client data, e.g., is the speech utterance from a company desktop or a personally owned smartphone, is the client device moving, the ambient background noise accompanying the speech sample. The class member can be also trained according to a specific environment/location, e.g., XYZ company headquarters or Joe's house.

Figure 6:
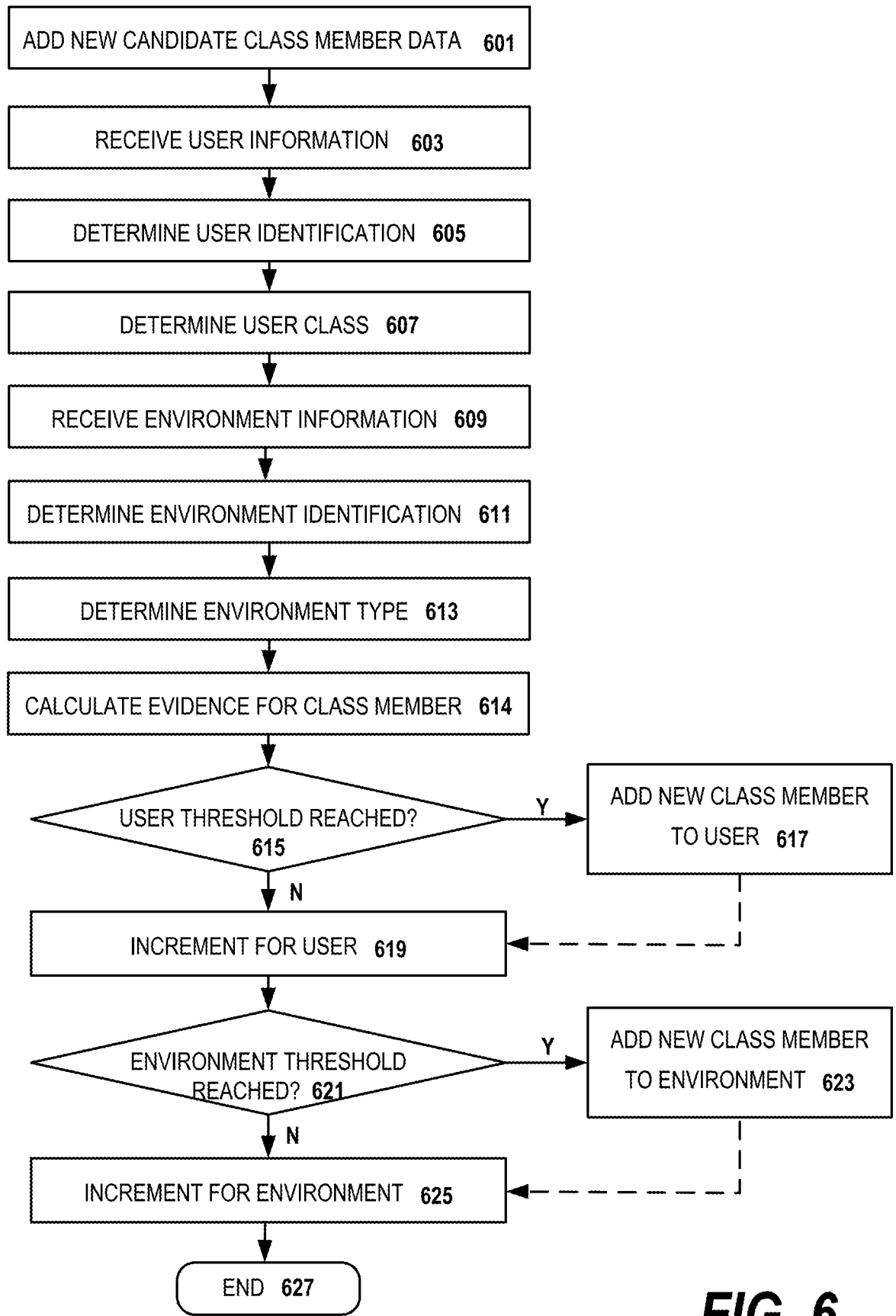
FIG. 6 is a flow diagram of adding evidence that class members should be added to a plurality of classes according to an embodiment of the invention.

FIG. 6 illustrates a flow diagram for an embodiment of the invention in which class members are trained according to user and environment characteristics. In embodiments of the invention, different classes, i.e. sets of class members, are trained and stored for respective users and different classes are stored for different environments. In yet other embodiments, a class is stored for a specific user in a specific environment. The same existing class member is present in different user and environment classes, as evidence accumulates, a new candidate class member (based on the existing class member) will have different amounts of evidence in different classes. Thus, as respective thresholds are crossed, the new candidate class member will become a class member in some classes, but not others. This figure also is used to illustrate where context is used to calculate the amount of evidence to be accumulated for a candidate mistranscription for a class member.

In step 601, new candidate class member data is received, that is, like the examples above, a candidate class member belonging to a respective class has been recognized with a candidate mistranscription. Steps 603-613 receive data useful for determining to which classes the new candidate member and candidate mistranscription belong as well as determining the context of the new candidate member and new candidate mistranscription. In step 603, user information is received. The user information can take many forms. In embodiments of the invention, log-in information identifies the user. As part of a registration process, the user has entered personal information such as name, gender, ethnicity and so forth. In other embodiments of the invention, the user information is biometric data which is used to identify and classify user. During the speech recognition, the system can make assumptions according to voice characteristics, e.g., timber, accent is consistent with an ethnic group. Finally, the system can enter an interactive dialog during a training phase to ask questions about identity, ethnicity, job role and so forth. The user information is used to determine the user identity in step 605 in embodiments where classes are trained and stored for individual users. The user information is used to determine the user class in step 607 in embodiments of the invention where classes are trained and stored for a user class. A user class is an ethnic group, group of organization members, or other group of users who are likely to use words similarly, that is, leading to similar mistranscriptions.

In step 609, the environment information is received. In embodiments of the invention, the environment information is geolocation information, optionally augmented by map information. In other embodiments, the environment information includes background noise captured with the speech, indicating a quiet or noisy environment, or movement information captured by a GPS or accelerometer, indicating a moving environment such as a vehicle. The environment information is used to uniquely determine an environment identification in step 611 in some embodiments of the invention. The environment information is used to determine an environment type in step 613 in other embodiments. In certain unique environments such as a work place or a school, particular terminology is used and so the same mistranscriptions will occur from different users. In environments of the same environment type, e.g., a noisy environment, the same mistranscriptions will tend to occur, e.g., the background noise is mistakenly recognized as speech. In embodiments of the invention, the environment information can also be used to determine a user class, e.g., where a location is associated with a class of users.

Although not shown, as was mentioned above in other embodiments, question information can also be received which is useful for determining the context in which the new candidate member was uttered. By comparing recent utterances to the current one, the system can determine a probability that the candidate mistranscription is a true mistranscription. Other data is received in other embodiments of the invention.

Once the system establishes to which classes the new candidate class member and candidate mistranscription belong, the system calculates how strong the evidence is for each particular class, step 614. For example, if the candidate class member and candidate mistranscription are uttered by a particular user in a particular environment, in embodiments of the invention, the evidence will be greater for classes which are trained and stored for that particular user or that particular environment, than for class members for user classes and environment types to which the user and environment respectively belong. By being able to train class members according to user, user class, environment and environment type simultaneously, it allows the system to have more samples and be trained more quickly. It also allows the system to have specifically trained class members for a particular user in a particular environment which will be the most accurate for detecting a mistranscription. That is, in embodiments of the invention, classes are trained for a specific combination of user and environment characteristics. The context of the candidate class member and candidate mistranscription, e.g., location, question information, are also used in embodiments of the invention to determine the amount of evidence which should be accumulated for the class member in each class.

Next, in step 615, a decision is made whether there has been sufficient evidence gathered for the mistranscription for a specific user class. If so, in step 617, the new class member with the mistranscription as a replacement for the original word in the class member is added to the class. If not, in step 619, the cumulative evidence for the mistranscription in the user class is incremented. A dotted line is shown from step 617, indicating that even when the evidence passes the threshold for the user class, the cumulative evidence for the user class can still be incremented.

Next in step 621, a decision is made whether there has been sufficient evidence gathered for the mistranscription for a specific environment class. If so, in step 623, the new class member with the mistranscription as a replacement for the original word in the class member is added to the class. If not, in step 625, the cumulative evidence for the mistranscription in the environment type is incremented. A dotted line is shown from step 623, indicating that even when the evidence passes the threshold for the environment type, the cumulative evidence can be incremented.

In the figure, only the decisions for a particular user and a particular environment are illustrated for ease in illustration. However, in alternative embodiments, similar decisions are made for each user class of the user classes to which the user belongs and environment types to which the environment belongs as well as classes for specific user/environment combinations.

In embodiments of the invention, all of the classes are loaded for training. However, when the classifier is used for recognizing whether a class member of a class was recognized, in embodiments of the invention where for example the user and environment are identified, only a selected group of classes for the particular user and/or the particular environment would be used by the classifier. In a distributed environment, where clients are used to collect speech samples from and interact with a plurality of individual users, being able to train the classes by the machine learning from all of the plurality of users, yet use only the most focused classes for the user and environment allows both faster training and better discrimination.

In yet other embodiments of the invention, once classes begin to be trained for a specific environment/user combination, the mistranscription analyzer stops loading other classes for training. For example, once the user/environment combination reaches a desired confidence level, not necessarily a high enough confidence level to add the class member to the class, other classes stop being trained in response to candidate mistranscriptions from the particular user/environment combination.

In alternative embodiments, one or more of the listed steps may not be performed. For example, where only class members are stored only according to user information, the environment related steps would not be performed. Where class members are only stored for individual users, the user class steps are not performed.

Figure 7:
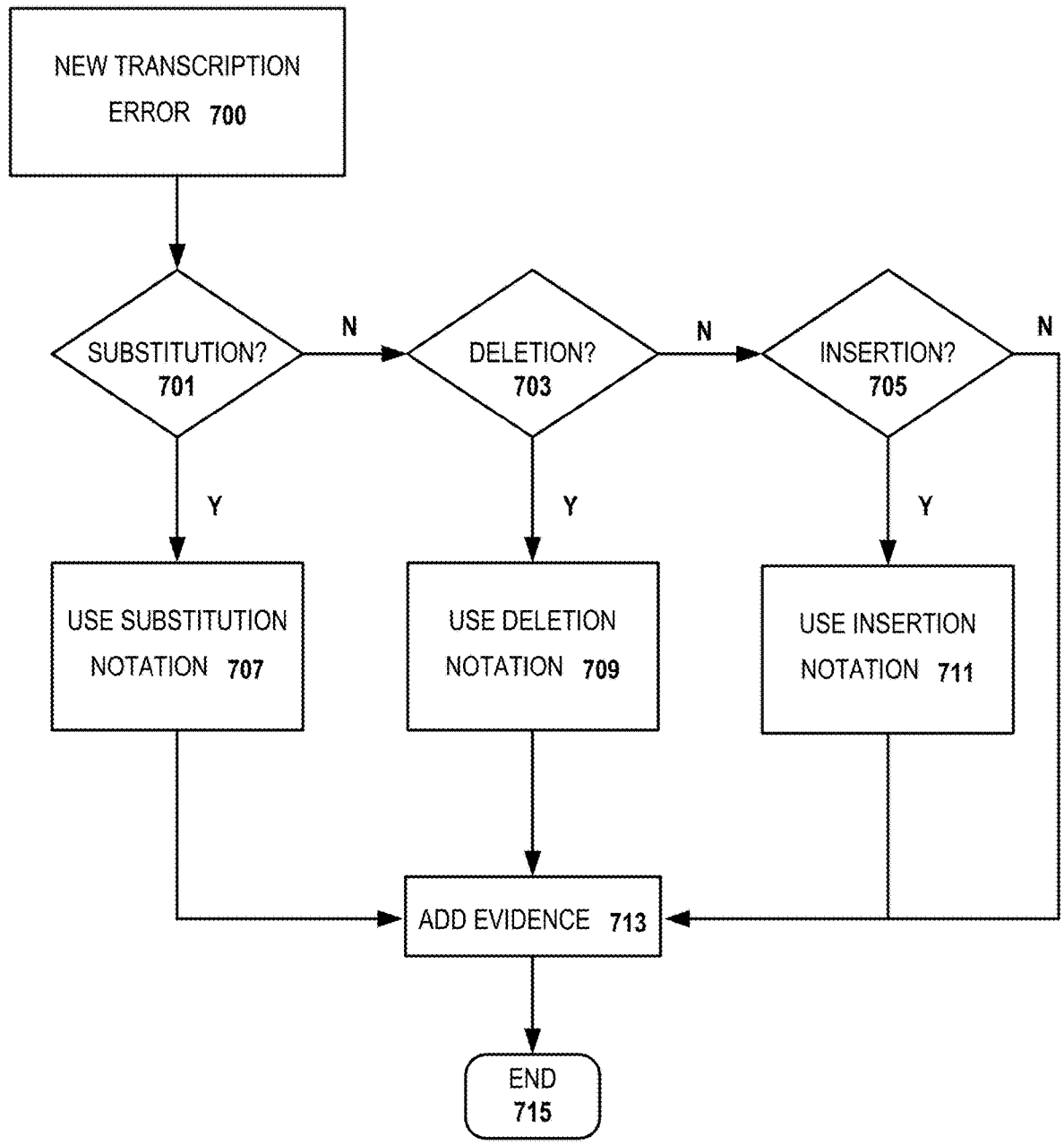
FIG. 7 is a diagram for detecting whether a new transcription error is a substitution, deletion or insertion error according to an embodiment of the invention.

In FIG. 7, the process for storing a new candidate mistranscription is illustrated. As mentioned above, a mistranscription can be a substitution error where the speech recognition system replaces the uttered word with an incorrect word, an insertion error, e.g., where the system recognizes a "garbage" utterance, e.g., breathing, background noise, "um", or a deletion error where one of the uttered words does not occur in the transcription. Each of these types of errors is likely to represent a different mistranscription. In addition, in embodiments of the invention, each type of mistranscription (substitution, insertion, deletion) would be stored differently.

In step 700, a new candidate mistranscription is detected. The system first determines whether the mistranscription is a substitution error in step 701. If the mistranscription is a substitution error there will be the same number of words in the candidate class member as the class member to which it is a potential alternative. If not, in step 703, the system determines whether the mistranscription is a deletion error. If the transcription is a deletion error one or more of the words from the existing class member are missing from the candidate class member. If the transcription error is not a deletion error the system determines whether it is an insertion error in step 705. For sake of simplicity in illustration, only the tests for a pure substitution error, a pure deletion error and a pure insertion error are shown. However, in alternative embodiments of the invention other tests for other types of transcription errors are performed. For example, within a candidate class member there can be multiple mistranscriptions of the same kind or different kinds, e.g., two substitution errors or a substitution error and an insertion error.

Once the system establishes what type of candidate mistranscription is in the candidate class member, an appropriate type of transcription error notation is used to keep track of the evidence. In step 707, substitution notation is used for a substitution error. This notation was discussed above in connection with FIG. 5. The position of the mistranscription within the class member is identified as $\{i\_j\}$, and the non-matching word pairs are denoted $(w\_\{i\_j\}, a\_\{i\_j\})$ The word pairs, the number of times the system has responded and been accepted, the number of times the system has responded and been rejected and the number of times the mistranscription was detected, but no response was given by the system In this illustrative embodiment, a general entry in the mistranscription hash is given by (w, a, CO, IN, NO)— where w=correct word, a=potentially mistranscribed word, CO=correct count (accepted), IN=incorrect count (rejected) and NO=no-response count.

In step 709, the deletion notation is used. Since this case, there is no word in the candidate class member, the word pair would be designated as $(w\_\{i\_j\}, 0\_\{i\_j\})$ to indicate that there is no word corresponding to word w in the candidate class member. The mistranscription hash in this case is given by (w, 0, CO, IN, NO).

Similarly, in step 711, the insertion notation is used if an insertion error is detected. An example notation denoting insertion is $(0\_\{i\_j\}, w\_\{i\_j\})$, with the associated mistranscription being given by (0, w, CO, IN, NO).

Once the transcription error evidence is incremented to the evidence accumulated for transcription errors for the class member, step 713. The process ends, step 715.

Whether the mistranscription is a substitution, deletion or substitution with respect to words in the received utterance as compared to the first utterance member, the received utterance varies in a first manner as compared to a first slot in the first utterance member. As evidence is incremented by the mistranscription analyzer that the received utterance is evidence of a mistranscription in the first manner at the first slot, it will pass a threshold, and add a second utterance member to the set of utterance members for use by the speech recognition system. The second utterance member as compared to the first utterance member, the second utterance member uses the change, heretofore identified as the "mistranscription" at the first slot in the first utterance member. Note that when the transcription error is an insertion or deletion error, the number of total slots in the resulting second utterance member will vary slightly, with an insertion error there will be more slots and with a deletion error there will be fewer slots, but the change is still considered to be at the first slot in the first utterance member.

Figure 8:
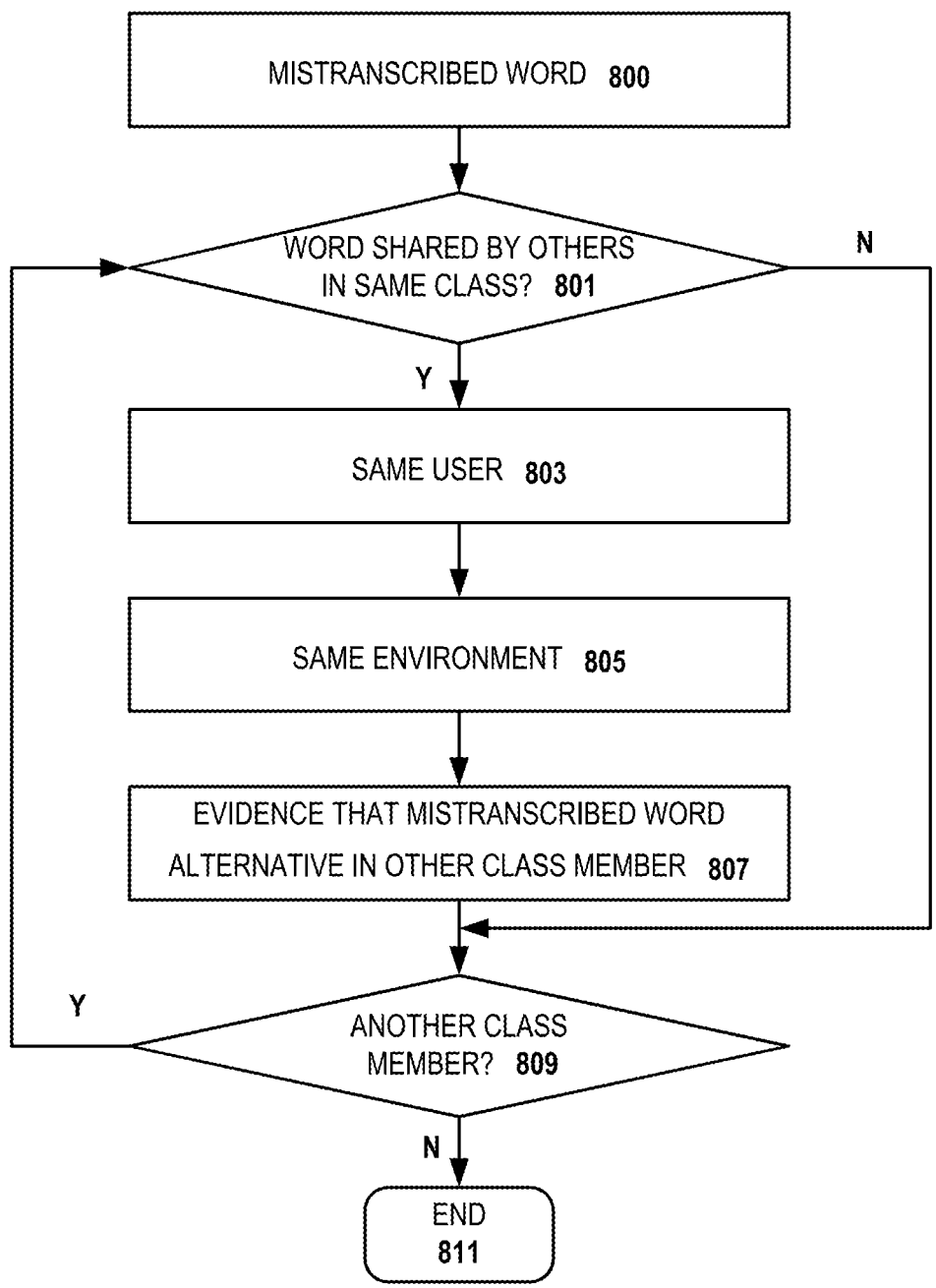
FIG. 8 is a flow diagram illustrating one embodiment for incrementing evidence that a mistranscribed word from one class member is evidence that the mistranscribed word is a legitimate alternative to the same word in another class member of the same class.

FIG. 8 is a flow diagram illustrating one embodiment for incrementing evidence that a mistranscribed word in one class member is evidence that the mistranscribed word is a legitimate alternative to the same word in another class member of the same class. Finding a single mistranscription in a long class member in a single instance, i.e. all the other words match, is considered strong evidence of a mistranscription in one preferred embodiment of the invention. However, in embodiments of the invention, evidence of a mistranscription in one class member is some, preferably lesser, evidence that the mistranscription is also a valid alternative in other class members.

The process begins in step 800 where a candidate mistranscription is recognized for a first class member in a class. Next, in step 801, the system determines whether the mistranscribed word is shared by another class member in the same class. If it is, a series of decisions are made to determine how strong the evidence is to increment the mistranscribed word for the other class member. For example, in step 803, the system determines whether the mistranscription is from the same user. If it is, it would be stronger evidence than a mistranscription from another user. As another example, if the mistranscription was received in the same environment, step 805, it would be stronger evidence than if the mistranscription was received in another environment. Additionally if the mistranscription was received by two users deemed to have the same first language, i.e. L1 language, it would be deemed to be stronger evidence than if the mistranscriptions were received by individuals with different L1 languages. As described above, the phonetic similarity between the word in the class member and the mistranscription would also be evidence. Also, as is also described above, the number of words correctly identified as compared to the number of candidate mistranscriptions can be a factor in the amount of the evidence to be added, but as this is a 'second-hand" factor, it would be less evidence than for the mistranscription in the class member itself. Other decisions such as whether the user was in the same user class or the environment was the same environment type as well as other tests could be incorporated in embodiments of the invention.

In step 807, the determined evidence that a mistranscribed word is a legitimate alternative in the other class member is incremented. If there are other class members, step 809, the process repeats until there are no other class members to accumulate evidence for. The process ends in step 811.

Figure 9:
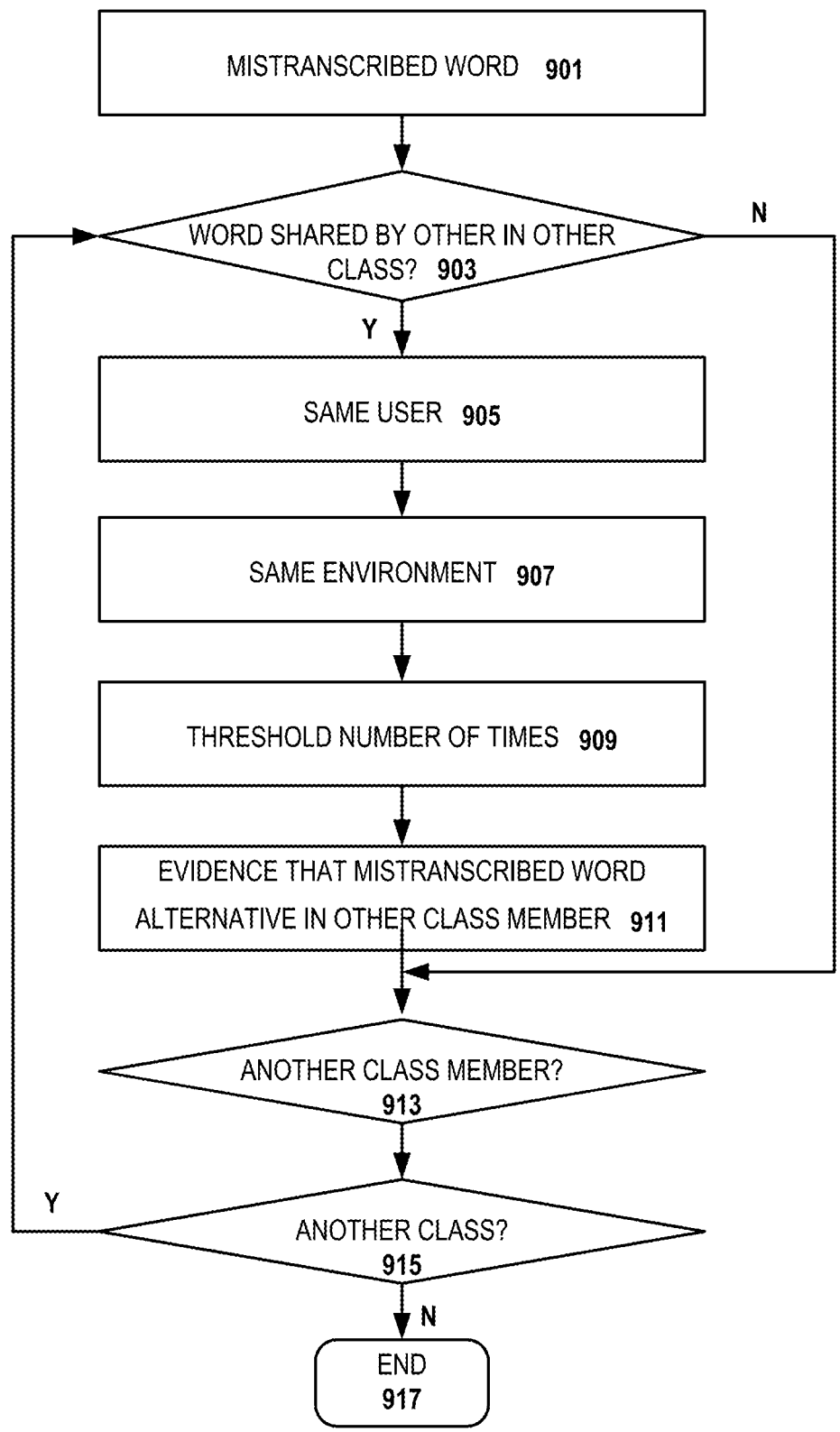
FIG. 9 is a flow diagram illustrating one embodiment for incrementing evidence that a mistranscribed word from one class is evidence that the mistranscribed word is a legitimate alternative to the same word in class members of a different class.

FIG. 9 is a flow diagram illustrating one embodiment for incrementing evidence that a mistranscribed word from one class is evidence that the mistranscribed word is a legitimate alternative to the same word in class members of a different class. The process begins in step 901 where a mistranscribed word is determined from one class and the system determines whether it should be considered evidence for a mistranscription for class members in other classes. In one embodiment of the invention, mistranscriptions from a class member of a different class is considered less evidence than a mistranscription from the same class. Nonetheless, it would still be some evidence as a particular user will likely pronounce the same word in the same way irrespective of the class in which the word occurs. Thus, the system would perform similar decisions as above. In step 903, the system would determine whether the mistranscribed word occurs in a class member of the new class, the new class being a different class than the class in which the mistranscription is detected. In step 905, the system determines whether the same user uttered the mistranscription. In step 907, the system determines whether the mistranscription was uttered in the same environment. Another decision is whether the same mistranscription has been uttered a threshold number of times. All of these factors are used to determine the amount of evidence that should be incremented that the mistranscribed word is a valid alternative in the other class member from a different class. Other tests could be used to determine whether evidence should be added to the class member.

Next, in step 903, it is determined whether there is another class member to examine. If so, the process returns to step 903. Next, in step 905, it is determined whether there is another class to examine, If not the process ends, step 917.

Figure 10:
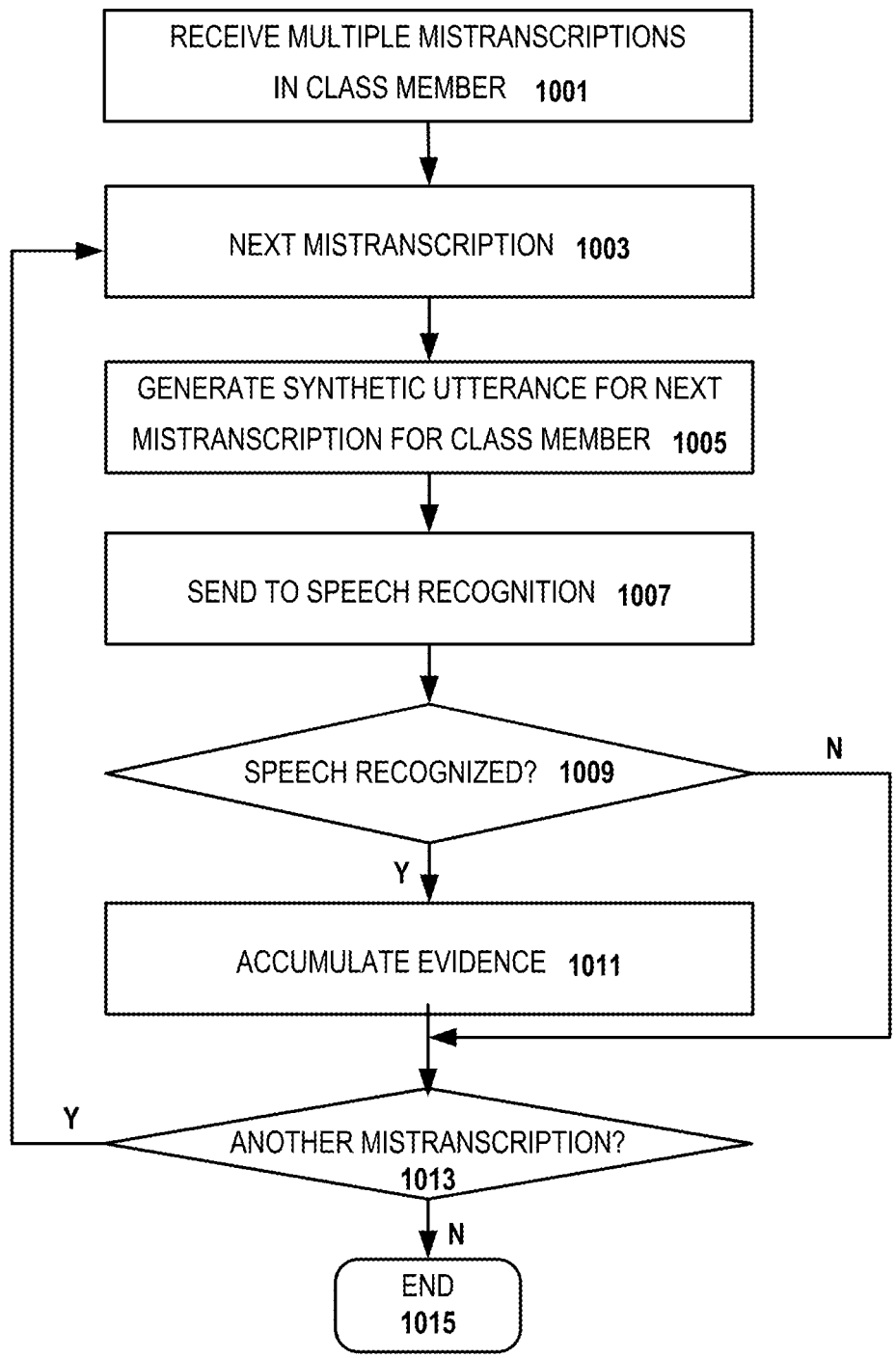
FIG. 10 is a flow diagram of one embodiment of the invention using the speech recognition system to acquire additional evidence.

In FIG. 10, a flow diagram of one embodiment of the invention using the speech recognition system to acquire additional evidence is shown. In one embodiment of the invention, when a transcription matches N_i–k of the words and the k remaining words are known to be somewhat likely mistranscriptions, but for which some subset of the associated single-term mistranscriptions have never been seen, the system synthetically creates, via a text-to-speech sub-system, an audio stream of the utterance with just the single word mispronounced, and feeds this stream to the speech recognition engine to see if the single word mistranscription is corrected. If corrected, additional evidence for the mistranscription is accumulated, and not otherwise. This embodiment of the invention takes advantage of a property of a speech recognition system which uses a sliding N-gram window. In such a speech recognition system, the engine automatically corrects some number of what would otherwise be mistranscriptions had the transcription been done a word at a time, by virtue of the sliding N-gram window in its hidden Markov model. On the other hand, some speech recognition engines provide word-by-word transcriptions, which are less precise, but faster than those that use a sliding N-gram or other correction means to output an utterance phrase at a time. The word-by-word transcripts are normally used by systems that must respond immediately upon hearing a word/phrase, and cannot afford to wait for a pause indicating completion of the utterance. So by pairing a word-by-word speech recognition engine for fast system response with a sliding N-gram speech recognition engine, evidence can be accumulated for new class members to be used by the word-by-word engine.

Comparing a word-by-word transcript to an utterance-at-a-time transcript provides many examples of likely mistranscriptions. For example, there are two or more suspected mistranscriptions in one utterance, say the sentence is of the form AA . . . XX . . . YY . . . BB and the suspected correct version is AA . . . QQ . . . RR . . . BB, where is QQ is considered to be a likely correction for XX and RR for YY. However, suppose the speech recognition engine has never recognized . . . QQ . . . YY . . . or . . . XX . . . RR . . . and all previous recognized utterances have only had a single substitution, so that the evidence is indirect. In this case, the system generates a synthetic speech system (using a Text-to-Speech system) to feed AA . . . QQ . . . YY . . . BB and AA . . . XX . . . RR . . . BB into the speech recognition system using an N-gram window or other corrective mechanism to see if the utterances get recognized. This would be evidence of both the single and the double substitution. If they are so recognized, there is additional evidence in support of the double mistranscription, otherwise not.

Referring to FIG. 10, in step 1001, an utterance with multiple mistranscriptions is received. The set of mistranscriptions are enumerated. In step 1003, the next mistranscription is selected. In step 1005, the system generates a new synthetic utterance which contains the next mistranscription for the particular class member. In preferred embodiments, only a single mistranscription from the set of mistranscriptions is used in the new synthetic utterance. In step 1007, the newly generated synthetic utterance is sent to the speech recognition system which uses an N-gram window or other corrective mechanism to see if the utterance is recognized, i.e. corrected. A decision is made whether the speech recognition recognized the synthesized utterance as the class member, step 1009. If not, the method proceeds to see if there is another mistranscription. If so, in step 1011, evidence is accumulated, that there is a mistranscription for the class member, and that therefore, a new class member should be added. In step 1013, the system determines whether there is another candidate mistranscription in the utterance. If so, the process returns to step 1003. If not, the process ends.

The process is extended to other class members within the class and other utterances which have the same possibly mistranscribed words in other embodiments. In ones of these embodiments, rules would be used to accumulate less evidence for other class members and other utterances than the class member originally recognized with the set of multiple mistranscriptions.

In embodiments of the invention, the system adds a new class member to a class by recognizing a new phrase and then entering an interactive question mode with the user to determine that the new phrase belongs to one of the existing classes.

In embodiments of the invention, a system administrator will define a set of class members for a given class. Then, the system will use synsets or an interactive question mode to add new class members to the class, in addition to the new class members added due to mistranscriptions.

While a preferred operating environment and use case have been described, the techniques herein may be used in any other operating environment in which it is desired to deploy services.

As has been described, the functionality above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for identification of a mistranscription generated by a speech recognition system comprising:
   providing a set of known utterance members for use by a speech recognition system, each utterance member consisting of a respective plural number of words;
   matching a received utterance to a first utterance member within the set of known utterance members, the first utterance member being a closest matching utterance member having a first plural number of words, wherein fewer than the first plural number of words in the received utterance are matched to the first plural number of words in the first utterance member and the received utterance varies in a first particular manner as compared to a first word in a first slot in the first utterance member;
   sending the received utterance to a mistranscription analyzer component;
   incrementing evidence, by the mistranscription analyzer, that the received utterance is evidence of a mistranscription, wherein the evidence is an occurrence of one of a substitution error where a second word recognized in place of the first word at the first slot in the received utterance, a deletion error where the first word is omitted at the received utterance or an insertion error where an extra word is inserted at the first slot in the received utterance; and
   responsive to incremented evidence for the mistranscription exceeding a threshold, treating a future received utterance containing the mistranscription as though the first word was recognized.

2. The method as recited in claim 1, wherein the received utterance uses the second word in place of the first word used in a first slot in the first utterance member;
   wherein the incremented evidence by the mistranscription analyzer is that the received utterance is evidence of a mistranscription replacing the second word for the first word.

3. The method as recited in claim 1, further comprising:
   responsive to matching a second received utterance to the first utterance member, sending the second received utterance to a mistranscription analyzer, wherein the matching matches a first plurality of the words, and a second plurality of the remaining words in the received utterance are candidate mistranscriptions;

generating a first synthetic utterance via a text-to-speech sub-system of an audio stream based on replacing a first contiguous set of words assumed to be a mistranscription from the second plurality of remaining words in the first utterance member with an assumed correct replacement;

transmitting the first synthetic utterance to a speech recognition engine with the above correcting feature; and responsive to a correction of the synthetic utterance to the first utterance member, accumulating evidence that the first contiguous set of words is a mistranscription of the assumed correct replacement.

4. The method as recited in claim 1, wherein the mistranscription analyzer matches a received utterance to a respective utterance member with a different number of words and with a single first candidate mistranscription results in a greater evidence for the first candidate mistranscription that contains one more contiguous words that do not exactly match one or more contiguous words in the respective utterance member.

5. The method as recited in claim 2, wherein the mistranscription analyzer uses a rule that increments evidence for a mistranscription of the second word for the first word in a second utterance member which also includes the first word, based on the received utterance matching the first utterance member, wherein an amount of evidence incremented for the mistranscription in the second utterance member is less than an amount of evidence incremented for the mistranscription in the first utterance member.

6. The method as recited in claim 1, wherein the mistranscription analyzer increments evidence for a mistranscription in the first manner at the first slot based on multiple received utterances from a first user having the mistranscription in the first manner at the first slot.

7. The method as recited in claim 2, further comprising incrementing evidence, by the mistranscription analyzer, that the received utterance is evidence of a mistranscription of the second word for the first word each time the received utterance is matched to the first utterance member so that with each received utterance where the second word is transcribed in place of the first word in the received utterance, the greater the evidence that is accumulated for the mistranscription.

8. The method as recited in claim 1, wherein the mistranscription analyzer uses a phonetic based rule that a greater degree of phonetic similarity between a second word in the received utterance and a first word at the first slot in the first utterance member results in a greater amount of evidence being incremented per instance of the received utterance than if no such phonetic similarity is detected.

9. The method as recited in claim 1, wherein the mistranscription analyzer increments evidence for a mistranscription in the first manner at the first slot based on multiple received utterances from a first environment having the mistranscription in the first manner at the first slot.

10. Apparatus, comprising:
a processor;
computer memory holding computer program instructions executed by the processor for identification of a mistranscription generated by a speech recognition system, the computer program instructions comprising:
program code, operative to provide a set of known utterance members for use by a speech recognition system, each utterance member consisting of a respective plural number of words;
program code, operative to match a received utterance to a first utterance member within the set of known utterance members, the first utterance member being a closest matching utterance member having a first plural number of words, wherein fewer than the first plural number of words in the received utterance are matched to the first plural number of words in the first utterance member and the received utterance varies in a first particular manner as compared to a first word in a first slot in the first utterance member;
program code, operative to send the received utterance to a mistranscription analyzer component;
program code, operative to increment evidence, by the mistranscription analyzer, that the received utterance is evidence of a mistranscription, wherein the evidence is an occurrence of one of a substitution error, a deletion error or an insertion error at the first slot in the received utterance; and
program code responsive to incremented evidence for the mistranscription exceeding a threshold, operative to treat a future received utterance containing the mistranscription as though the first word was recognized.

11. The apparatus as recited in claim 10, wherein the received utterance uses the second word in place of the first word used in a first slot in the first utterance member;
wherein the incremented evidence by the mistranscription analyzer is that the received utterance is evidence of a mistranscription replacing the second word for the first word.

12. The apparatus as recited in claim 10, further comprising:
program code responsive to matching a second received utterance to the first utterance member, operative to send the second received utterance to a mistranscription analyzer, wherein the matching matches a first plurality of the words, and a second plurality of the remaining words in the received utterance are candidate mistranscriptions;
program code, operative to generate a first synthetic utterance via a text-to-speech sub-system of an audio stream based on replacing a first contiguous set of words assumed to be a mistranscription from the second plurality of remaining words in the first utterance member with an assumed correct replacement;
program code, operative to transmit the first synthetic utterance to a speech recognition engine with the above correcting feature; and
program code responsive to a correction of the synthetic utterance to the first utterance member, operative to accumulate evidence that the first contiguous set of words is a mistranscription of the assumed correct replacement.

13. The apparatus as recited in claim 11, wherein the mistranscription analyzer increments evidence for a mistranscription of the second word for the first word wherein evidence of a mistranscription for a first user who uttered the received utterance is greater than evidence of a mistranscription for other users of the apparatus.

14. The apparatus as recited in claim 11, wherein the mistranscription analyzer increments evidence for a mistranscription of the second word for the first word in the first utterance wherein evidence of a mistranscription for a first environment in which the received utterance is received is greater than evidence of a mistranscription from other environments from which utterances are received by the apparatus.

15. A computer program product in a non-transitory computer readable medium for use in a data processing system, the computer program product holding computer program instructions executed by the data processing system for identification of a mistranscription generated by a speech recognition system, the computer program instructions comprising:

program code, operative to provide a set of known utterance members for use by a speech recognition system, each utterance member consisting of a respective plural number of words;

program code, operative to match a received utterance to a first utterance member within the set of known utterance members, the first utterance member being a closest matching utterance member having a first plural number of words, wherein fewer than the first plural number of words in the received utterance are matched to the first plural number of words in the first utterance member and the received utterance varies in a first particular manner as compared to a first word in a first slot in the first utterance member;

program code, operative to send the received utterance to a mistranscription analyzer component;

program code, operative to increment evidence, by the mistranscription analyzer, that the received utterance is evidence of a mistranscription, wherein the evidence is an occurrence of one of a substitution error, a deletion error or an insertion error at the first slot in the received utterance; and program code responsive to incremented evidence for the mistranscription exceeding a threshold, operative to treat a future received utterance containing the mistranscription as though the first word was recognized.

16. The computer program product as recited in claim 15, wherein the received utterance uses the second word in place of the first word used in a first slot in the first utterance member;

wherein the incremented evidence by the mistranscription analyzer is that the received utterance is evidence of a mistranscription replacing the second word for the first word.

17. The computer program product as recited in claim 15, further comprising:

program code responsive to matching a second received utterance to the first utterance member, operative to send the second received utterance to a mistranscription analyzer, wherein the matching matches a first plurality of the words, and a second plurality of the remaining words in the received utterance are candidate mistranscriptions;

program code, operative to generate a first synthetic utterance via a text-to-speech sub-system of an audio stream based on replacing a first contiguous set of words assumed to be a mistranscription from the second plurality of remaining words in the first utterance member with an assumed correct replacement;

program code, operative to transmit the first synthetic utterance to a speech recognition engine with the above correcting feature; and program code responsive to a correction of the synthetic utterance to the first utterance member, operative to accumulate evidence that the first contiguous set of words is a mistranscription of the assumed correct replacement.

18. The computer program product as recited in claim 15, further comprising:

program code responsive to incremented evidence for the mistranscription in the first manner at the first slot of the first utterance member exceeding an intermediate threshold lower than the first threshold, adding the second utterance member as a provisional member of the set of utterance members for use by the speech recognition system;

program code, operative to increment evidence, by the mistranscription analyzer, that the received utterance is evidence of a mistranscription in the first manner at the first slot based on a user acceptance of a system response, the system response for the first utterance member.

19. The computer program product as recited in claim 16, wherein the mistranscription analyzer increments evidence for a mistranscription of the second word for the first word wherein evidence of a mistranscription for a user in a first user class who uttered the received utterance is greater than evidence of a mistranscription for users in other user classes.

20. The computer program product as recited in claim 16, wherein the mistranscription analyzer increments evidence for a mistranscription of the second word for the first word in the first utterance wherein evidence of a mistranscription for an environment in a first environment type in which the received utterance is received is greater than evidence of a mistranscription from environments in other environment types.

* * * * *